INVENTOR
DAVID P. COFFIN Jr.
ATTORNEY

United States Patent Office 3,548,200
Patented Dec. 15, 1970

3,548,200
SIGNAL COUPLING DEVICE
David Painter Coffin, Jr., Bethesda, Md., assignor, by mesne assignments, to Versitron, Inc., Washington, D.C., a corporation of the District of Columbia
Filed Jan. 24, 1969, Ser. No. 793,688
Int. Cl. H05k 9/00
U.S. Cl. 307—89                                    24 Claims

ABSTRACT OF THE DISCLOSURE

A device for coupling electro-magnetically carried signal information from a first chamber to a second chamber which chambers are electro-magnetically isolated from each other while substantially blocking the passage of undesired electro-magnetic energy between the chambers. An opening is provided between the chambers which is dimensioned to operate as a waveguide below cutoff with an upper cutoff frequency above that of the undesired electro-magnetic energy. The signal information is converted into a mechanical movement in the first chamber and is conveyed through the waveguide to the second chamber in this form. The second chamber contains a means for reconverting the mechanical force or the mechanical movement into signal information.

---

This invention relates to a device for coupling signal information between two electro-magnetically isolated chambers and more particularmly to a device for coupling signal information between the chambers while substantially blocking the passage of undesired electro-magnetic energy between the chambers.

There are many instances when it is desired to transmit or couple electrical signal intelligence from one physical location to another while at the same time providing a high attenuation of, or virtual shielding against the transmission of spurious electro-magnetic signals between the two locations. For example, in the case of a shielded enclosure of the type referred to as a "screen room" in which electronic devices are often tested, it is frequently desirable to provide means for communicating data derived from a device under test within the screen room to a point outside the room for monitoring purposes. On the other hand, spurious signals conditionally present in the environment outside the room must be prevented from entering the room and possibly affecting sensitive equipment and measurements. Similarly, it may be desired to transmit an electrical signal from a position outside the shielded room to a terminal inside the room for controlling the apparatus therein. Again, spurious signals originating from the outside environment should be prevented from entering the room.

One method which has previously been used to couple signals between a shielded room and a position outside, while eliminating the spurious and undesired signals, has been to use filters in the signal transmission line. This is not, however, entirely satisfactory because filters are basically bilateral devices; that is, a filter will conduct in either direction and will not prevent undesired signals from being passed if they are within the frequency pass-band of the filter. Since the signal information which it is desired to transmit between the isolated chamber and the external environment is frequently of the same or similar frequency as the spurious signals, a simple filter does not provide an adequate solution to the isolation problem.

In U.S. Pat. No. 3,385,970 issued May 28, 1968 to D. P. Coffin et al., entitled "Nonreciprocal Signal Coupling Apparatus Using Optical Coupling Link in Waveguide Operating Below Cutoff," and assigned to the assignee of the instant application, an improved coupler is shown which makes use of the fact that a waveguide, dimensioned to have a cutoff frequency above that of the spurious electrical energy, will provide a high attenuation to such energy. The signal information is first converted to an electro-magnetic wave, such as a light wave, having a frequency above the cutoff frequency of the waveguide and is transmitted through the waveguide in this form. A transducer of suitable type in the second chamber is utilized to convert the high-frequency wave energy back to its original electrical form. This device provides excellent coupling and isolation. However, only a limited number of components are available for use in devices of this type so that the devices tend to be relatively large, expensive and complex. In many applications, particularly where only low-rate binary information is to be coupled, cheaper and simpler isolator devices are required. Similarly, applications also exist where more compact isolators are required. Another potential problem with these devices arises from their requirement for sensitive, high-gain detectors. Expensive shielding may be required, particularly where a number of devices are stacked adjacent to each other, in order to prevent output errors resulting from the detection of ambient light, light from an adjacent device, or other electro-magnetic energy.

It is therefore a primary object of this invention to provide an impmroved device for coupling information signals while blocking spurious electro-magnetic signals.

A more specific object of this invention is to provide a relatively simple and inexpensive device of the type described above.

Another object of this invention is to provide a device of the type described above which is not subject to errors resulting from ambient conditions.

Still another object of this invention is to provide a class of devices of the type described above so that a choice may be made of the most suitable device for any given application.

In accordance with these objects this invention provides a device for coupling electmro-magnetically carried signal information from a first chamber to a second chamber which chambers are electro-magnetically isolated from each other, while substantially blocking the passage of undesired or spurious electro-magnetic energy between the chambers. The device includes an opening in the wall separating the chambers which opening is dimensioned so as to operate as a waveguide below cutoff with an upper cutoff frequency above that of the undesired electro-magnetic energy. Means are provided in the first chamber for converting the signal information into a mechanical force or a mechanical movement. The mechanical movement which may be either longitudinal, vibrational or rotational, or the mechanical force is fed through the waveguide to the second chamber by a suitable member constructed of electrical non-conducting material. The second chamber contains a means for reconverting the mechanical force or the mechanical movement into signal information.

The foregoing and other objects, features and advantages of the invention will be apparent from the following more particular description of preferred embodiments of the invention, as illustrated in the accompanying drawings.

Figure 1:
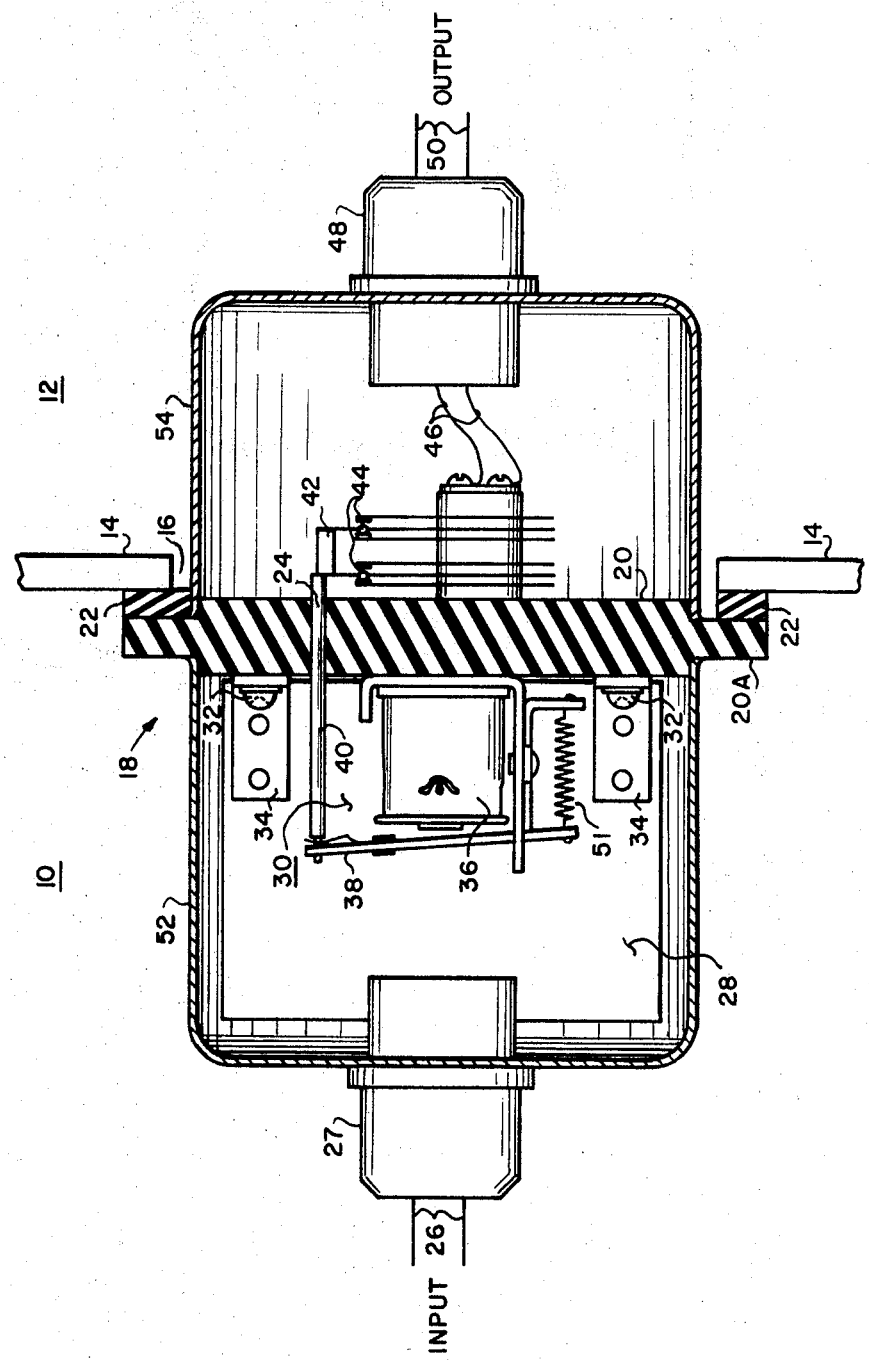
FIG. 1 is a sectional view of a preferred embodiment of the invention.

FIG. 1 illustrates a preferred embodiment of the invention for use where information is transferred between two chambers in a binary coded form. In this embodiment of the invention information in the first chamber is utilized to energize a relay, the armature of which drives a rod of non-conducting material through the waveguide opening between the chambers. This rod transfers contacts located in the second chamber to effect the desired information transfer.

Referring now to FIG. 1 it is seen that a first chamber 10 and a second chamber 12 are separated from each other by an isolating wall 14. This wall would preferably be of a magnetic material, but could be of any material providing adequate shielding at required frequencies. Wall 14 has an opening 16 therein in which an isolator device 18 is positioned. Isolator device 18 includes a bulkhead 20 having a flange 20A. Flange 20A is mounted to wall 14 by conventional means such as screws (not shown). A gasket 22 is interposed between flange 20A and wall 14 to prevent any leakage of electro-magnetic energy below the cutoff frequency of the waveguide around the flange into the shielded chamber. Bulkhead 20 has an opening 24 formed through it which opening is of suitable dimensions to serve as an attenuating waveguide below cutoff for spurious electro-magnetic signals in chamber 10. The required dimensions for waveguide 24 in order to achieve the desired cutoff frequency and attenuation may be derived from literature such as that cited in the before-mentioned Pat. No. 3,385,970. For example, it may be shown that a waveguide ⅛ inch in diameter will have a cutoff frequency of approximately 25 gigahertz. This frequency will vary only slightly depending on the dielectric characteristics of the material in the waveguide opening. The attenuation for signals below the cutoff frequency is dependent upon the ratio of the length of the waveguide to its diameter and is approximately 27 db for each unit of this ratio. Therefore, if the bulkhead is ½ inch wide, the dimension ratio would be 4 to 1, giving an attenuation of slightly over 100 db. This is more than adequate in most applications.

Information which it is desired to transmit between chambers 10 and 12 is applied through lines 26 and connector plug 28 to printed circuit board 28. Printed circuit board 28 amplifies and modifies the signals on line 26 to obtain signals of a suitable form to operate relay 30. Circuit board 28 may also contain circuitry for performing various logical manipulations on the input signals. Circuit board 28 and relay 30 are secured to bulkhead 20 by screw 32 and brackets 34.

When it is desired to transmit a binary 1 between chambers 10 and 12, circuit board 28 energizes relay coil 36 of relay 30, causing armature 38 to move from left to right. Rod 40, which may be made of plastic or similar non-magnetic and electrically non-conducting material, is attached to armature 38 by conventional means, such as by a screw or pin (not shown), and therefore moves from left to right with the armature. This results in rod 40 being moved a short distance from chamber 10 into chamber 12. The resulting force applied to member 42 causes a corresponding movement of this member resulting in the transferring of the normally open and normally closed contacts 44. The contacts 44 may be connected through suitable wires 46 to a circuit board (not shown) inside the isolator assembly, or may be connected through the wires 46 and a connector plug 48 to output leads 50. When the signal applied to coil 36 terminates, the force exerted by spring 51 returns armature 38 to the position shown in FIG. 1. Since rod 40 is attached to armature 38, the right to left movement of armature 38 pulls rod 40 toward chamber 10, permitting contacts 44 to return to their normal positions.

A device is thus provided which converts electrical signals into a mechanical movement for transference to an isolated chamber, and reconverts the mechanical movement back into electrical signals in the isolated chamber. The mechanical movement is transferred through a waveguide which is dimensioned to have a cutoff frequency above the frequency of any spurious electro-magnetic signals which may be present in the chambers. This prevents the transference of undesired electromagnetic energy between the two chambers.

With an isolator of the type shown in FIG. 1, the only possible way in which spurious signals in chamber 10 could influence chamber 12 would be for these signals to somehow cause relay 30 to be energized by for example causing an erroneous output from circuit board 28. While such an occurrence is extremely unlikely, a metallic shield 52 attached to bulkhead 20 is provided to isolate circuit board 28 and relay 30 from the remainder of chamber 10. A shield 54 of metallic material soldered to bulkhead 20 is similarly provided in chamber 12. Shielding covers 52 and 54 also serve to protect against dirt, radiation, and other contaminants in the environment.

In the embodiment of the invention shown in FIG. 1, relay 30 has been mounted so that rod 40 is driven toward chamber 12 when the relay is energized. It is also within the contemplation of the invention to mount relay 30 in the opposite direction so that, when the relay is energized, armature 38 moves from right to left, thus pulling rod 40 from chamber 12 towards chamber 10. Under these conditions rod 40 would be secured to member 42 such that the pulling of the rod would cause the transferring of contacts 44. A flexible member such as a piece of string could be substituted for rod 40 with this embodiment of the invention. Another possible modification on the embodiment of the invention shown in FIG. 1 would be to substitute a positive return for the spring 51.

Figure 2:
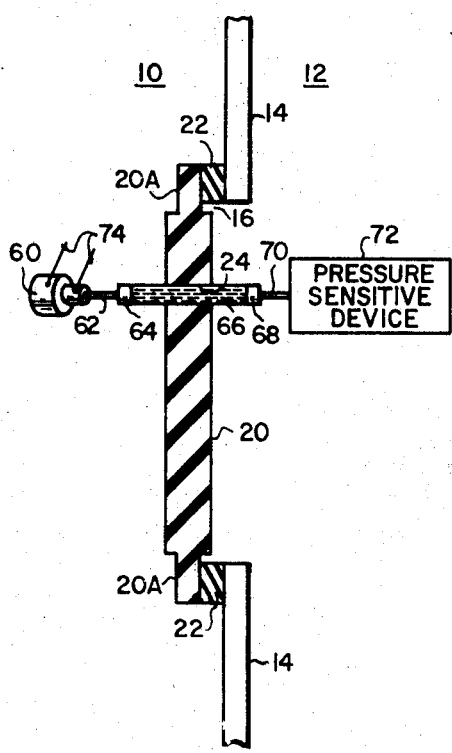
FIG. 2 is a simplified sectional view of a first alternative embodiment of the invention.

FIG. 2 illustrates another alternative embodiment of the invention. In this figure, and those to follow, all like elements bear the same number. Thus, in the embodiment of FIG. 2 there are chambers 10 and 12 separated by wall 14 having an opening 16, and a bulkhead 20, having a waveguide opening 24, is secured to wall 14. Shielding covers 52 and 54 have not been shown in FIGS. 2, 3 and 4 in order to simplify these drawings. However, these covers would, in all likelihood, be present for most applications of the invention. In FIG. 2 analog rather than binary information is being transferred and a piston adder is therefore utilized as the means for converting the electrical input into a mechanical movement. Piston adder 60 applies force through a shaft 62 to a plunger 64 at one end of a tube 66. The tube is filled with a liquid or oil and passes from chamber 10 to chamber 12 through waveguide 24. Tube 66 contains, at its chamber 12 side, a piston 68. If desired, piston 68 may be caused to have greater pressure or movement than piston 64 by tapering tube 66 at one end or the other. Piston 68 is connected through shaft 70 to a pressure sensitive device 72, such as a piezoelectric crystal. Device 72 may also be a pressure sensitive resistor with suitable energizing circuitry. The inputs on line 74 to piston adder 60 will cause it to assume a predetermined physical configuration which in turn will control the position of plunger 64. Pressure by plunger 64 against the fluid in tube 66 causes a corresponding change in position of piston 68 or pressure on the output device. The position of piston 68 determines the pressure applied to device 72 and thus the electrical output from the device. Another combination for converting an electrical signal into a mechanical movement and for then reconverting the mechanical movement back into an electrical signal is thus provided. If the fluid in tube 66 is gas rather than liquid, a pneumatic rather than a hydraulic coupling between the chambers is achieved.

Figure 3:
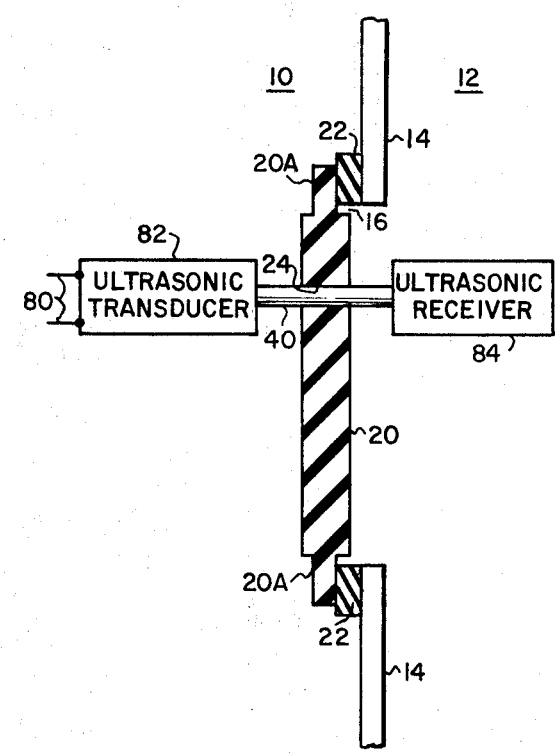
FIG. 3 is a simplified sectional view of a second alternative embodiment of the invention.

FIG. 3 illustrates still another embodiment of the invention. In this embodiment of the invention input signals on line 80 control the vibrating frequency of ultrasonic transducer 82. The vibrations of transducer 82 are transmitted through rod 40 of electrically non-conducting material to ultrasonic receiver 84. Receiver 84 is capable of reconverting the received vibrations into desired electrical signals. It should be noted that, even though the frequency of the ultrasonic vibrations are below the cutoff frequency of the waveguide, these physical vibrations will be transmitted through the rod 40 to chamber 12. Transducer 82 and receiver 84 need not necessarily be ultrasonic in order for this embodiment of the invention to operate. Transducer 82 may be any device capable of converting an electrical input into a mechanical vibration and device 84 may be any device capable of receiving this vibration and converting it back into an electrical signal.

Figure 4:
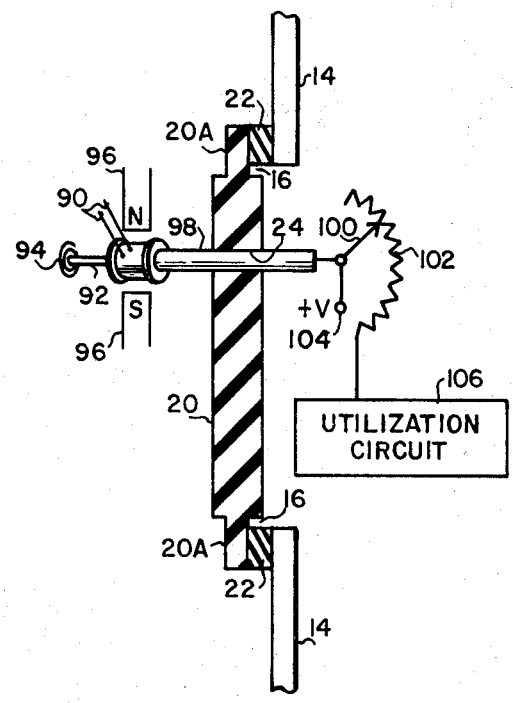
FIG. 4 is a simplified sectional view of a third alternative embodiment of the invention.

FIG. 4 illustrates still another embodiment of the invention wherein the electrical information applied to the device is converted into a rotational rather than a longitudinal motion. Analog information on lines 90 is applied to galvanometer coil 92 causing the coil to rotate against the tension of spring 94. This rotation, which results from the coil being positioned in the field of magnets 96, is proportional to some electrical characteristic of the input. The rotation of coil 92 causes a corresponding rotation of rod 98 which rod passes through waveguide 24 in bulkhead 20. Arm 100 of rheostat 102 is connected to rotate with rod 98. Therefore, the voltage from voltage source 104 is applied to utilization circuit 106 will vary depending on the input applied through lines 90. The circuit thus converts an analog electrical input into a rotational-type mechanical movement which movement is then reconverted back into an electrical signal.

From the above it is apparent that the embodiments of the invention in FIGS. 1–4 are merely illustrative, and that various modifications may be made in these embodiments while still remaining within the contemplation of the invention. For example, the transfer contacts 44 shown in FIG. 1, the pressure sensitive device 72 shown in FIG. 2, and the rheostat arrangement 100–106 shown in FIG. 4 may be freely interchanged between these various embodiments of the invention. The contacts 44 are, however, limited in that they can only be utilized to give binary coded outputs. It is, of course, apparent that a rod rather than a fluid might be utilized with the embodiment of the invention shown in FIG. 2. Other transpositions of elements might also suggest themselves to those skilled in the art. Similarly, the invention is not limited to the particular elements shown for (1) converting the electrical input into a mechanical force or a mechanical movement in the first chamber, (2) transmitting the force or movement through the waveguide, and (3) performing the reconversion operation of the force or movement to an electrical signal in the second chamber, and any elements suitable for performing these functions may be utilized. While in all of the embodiments of the invention described above, there has been both a mechanical force and a mechanical movement, embodiments of the invention could be provided in which there is a mechanical force transmitted between chambers accompanied by little if any mechanical movement. Such an embodiment could, for example, be obtained from the device shown in FIG. 2 by utilizing a pressure generating transducer in chamber 10, utilizing an uncompressible fluid in tube 66, and retaining piston 68 against movement.

While the invention has been particularly shown and described with reference to preferred embodiments of the invention it will be understood by those skilled in the art that the foregoing and other changes in form and details may be made therein without departing from the spirit and scope of the invention.

What is claimed is:

1. A device for coupling electro-magnetically carried signal information from a first chamber to a second chamber, which chambers are electro-magnetically isolated from each other by an isolating wall, while substantially blocking the passage of undesired electro-magnetic energy between said chambers comprising:
an opening in said wall, said opening being dimensioned so as to act as a waveguide below cutoff with an upper cutoff frequency above that or any or said undesired electro-magnetic energy;
means in said first chamber for converting said signal information into a mechanical movement;
means for conveying said mechanical movement through said waveguide to said second chamber; and
means in said second chamber for reconverting said mechanical movement into signal information.

2. A device of the type described in claim 1 wherein said mechanical movement is a longitudinal movement.

3. A device of the type described in claim 1 wherein said mechanical movement is a vibrational movement.

4. A device of the type described in claim 1 wherein said mechanical movement is a rotational movement.

5. A device of the type described in claim 2 wherein said signal information is binary coded, each individual bit of the binary code being represented by one of two possible signal levels; and
wherein said converting means moves said conveying means to a first position in response to one of said signal levels and moves said conveying means to a second position in response to the other signal level.

6. A device of the type described in claim 5 wherein said converting means is a relay, the armature of which is positioned to move said conveying means to said first position when said relay is not energized and to move said conveying means to said second position when said relay is energized.

7. A device of the type described in claim 6 wherein said conveying means is a rod of electrically non-conducting material which rod is positioned in said waveguide and is adapted to be moved from said first chamber toward said second chamber when said relay is energized.

8. A device of the type described in claim 5 wherein said reconverting means is a set of contacts which are adapted to be transferred when said conveying means is moved to said second position.

9. A device of the type described in claim 2 wherein said conveying means is a fluid-filled tube of electrically non-conducting material;
wherein said converting means includes means for applying pressure to said fluid; and
wherein said reconverting means includes means responsive to pressure applied to said fluid for generating a predetermined electrical output.

10. A device of the type described in claim 2 wherein said signal information is represented as a plurality of different signal levels; and
wherein said converting means is adapted to assume a different position in response to each of said levels.

11. A device of the type described in claim 3 wherein said converting means is an acoustic transducer; and
wherein said reconverting means is an acoustic receiver.

12. A device of the type described in claim 11 wherein said acoustic transducer is an ultrasonic transducer; and
wherein said acoustic receiver is an ultrasonic receiver.

13. A device of the type described in claim 4 wherein said converting means is a galvanometer coil in a magnetic field; and
including means for applying said signal information to said coil.

14. A device of the type described in claim 13 wherein said conveying means is a rod of electrically non-conducting material positioned to pass through said waveguide and adapted to rotate with said coil.

15. A device of the type described in claim 1 wherein said signal information is represented as a plurality of different signal levels; and
wherein said converting means is adapted to assume a different position in response to each of said levels.

16. A device of the type described in claim 1 wherein said reconverting means is a pressure sensitive device of the type having an output which varies in response to variations in the pressure applied at its input.

17. A device of the type described in claim 1 wherein said reconverting means includes a variable resistance device, and means responsive to the movement conveyed by said conveying means for controlling the resistance of said variable resistance device.

18. A device for coupling electro-magnetically carried signal information from a first chamber to a second chamber, which chambers are electro-magnetically isolated from each other by an isolating wall, while substantially blocking the passage of undesired electro-magnetic energy between said chambers comprising;
   an opening in said wall, said opening being dimensioned so as to act as a waveguide below cutoff with an upper cutoff frequency above that of any of said undesired electro-magnetic energy;
   means in said first chamber for converting said signal information into a mechanical force;
   means for conveying said mechanical force through said waveguide to said second chamber; and
   means in said second chamber for reconverting said mechanical force into signal information.

19. A device of the type described in claim 18 wherein said signal information is binary coded, each individual bit of the binary code being represented by one of two possible signal levels; and
   wherein said converting means applies a force to said conveying means in response to one of said signal levels and applies no force to said member in response to the other signal level.

20. A device of the type described in claim 19 wherein said converting means is a relay, the armature of which is positioned to apply a force to said conveying means when said relay is energized.

21. A device of the type described in claim 19 wherein said reconverting means is a set of contacts which are adapted to be transferred when a force is applied to said conveying means.

22. A device of the type described in claim 18 wherein said conveying means is a fluid-filled tube of electrically non-conducting material;
   wherein said converting means includes means for applying pressure to said fluid; and
   wherein said reconverting means includes means responsive to pressure applied to said fluid for generating a predetermined electrical output.

23. A device of the type described in claim 18 wherein said converting means is an acoustic transducer; and
   wherein said reconverting means is an acoustic receiver.

24. A device of the type described in claim 18 wherein said signal information is represented as a plurality of different signal levels; and
   wherein said converting means is adapted to apply a different force to said force receiving means in response to each of said levels.

References Cited
UNITED STATES PATENTS

| | | | |
|---|---|---|---|
| 1,962,995 | 6/1934 | McNeil | 333—12UX |
| 3,151,225 | 9/1964 | Seulen | 335—202 |
| 3,153,149 | 10/1964 | Finigan | 174—35X |
| 3,227,925 | 1/1966 | Cook | 317—58 |
| 3,315,147 | 4/1967 | Cook et al. | 317—58X |

ROBERT K. SCHAEFER, Primary Examiner

T. B. JOIKE, Assistant Examiner

U.S. Cl. X.R.

307—143; 335—135, 301